March 6, 1962     A. E. DAVIDSON     3,024,031
TOOL HANDLE ADAPTER SOCKET
Filed Sept. 4, 1959
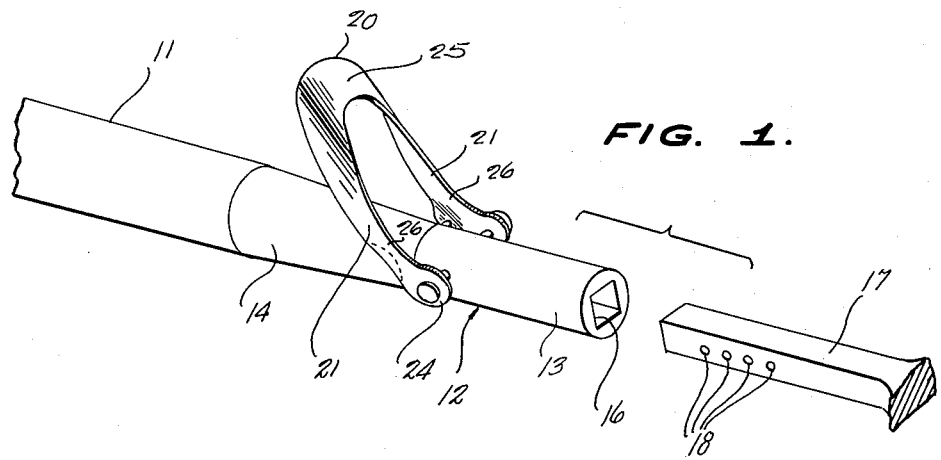
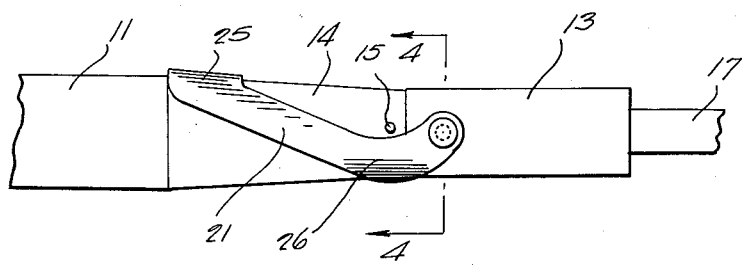
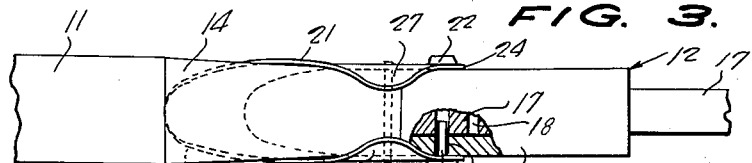
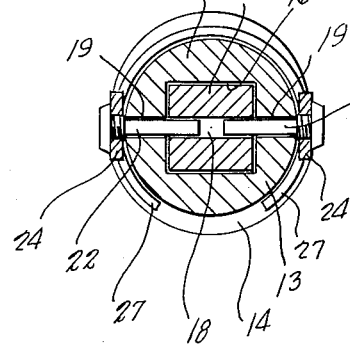
INVENTOR.
ALVIN E. DAVIDSON,
BY
McMorrow, Berman & Davidson
ATTORNEYS.

United States Patent Office 3,024,031
Patented Mar. 6, 1962

3,024,031
TOOL HANDLE ADAPTER SOCKET
Alvin E. Davidson, 3841 Avon St., Riverside, Calif.
Filed Sept. 4, 1959, Ser. No. 838,306
4 Claims. (Cl. 279—79)

This invention relates to tool handles, and more particularly to a socket device adapted to be secured to a tool handle and adapted to be employed for detachably fastening various different tools to the handle.

A main object of the invention is to provide a novel and improved tool handle adapter socket which is simple in construction, which is easy to operate, and which provides a means for quickly and easily fastening a desired tool to a tool handle without requiring the use of tools such as wrenches, screwdrivers or the like.

A further object of the invention is to provide an improved tool handle adapter socket which is inexpensive to fabricate, which is durable in construction, and which is arranged to detachably fasten any one of a different number of tools to a tool handle in a secure and reliable manner.

Further objects and advantages of the invention will become apparent from the following description and claims, and from the accompanying drawings, wherein:

FIGURE 1 is a perspective view of an improved tool handle socket device according to the present invention, shown arranged to receive the shank of a tool.

FIGURE 2 is a side elevational view of the socket device of FIGURE 1 in fastening position.

FIGURE 3 is a top plan view, partly in horizontal cross section, of the socket device of FIGURE 2.

FIGURE 4 is an enlarged transverse vertical cross sectional view taken on the line 4—4 of FIGURE 2.

FIGURE 5 is a transverse vertical cross sectional view similar to FIGURE 4, but showing the socket device in its releasing position.

Referring to the drawings, 11 designates a handle for a tool, and 12 generally designates a socket device according to the present invention which is secured to the handle 11 and which thereby enables various different types of tools to be fastened to the handle. The socket device 12 comprises a generally cylindrical sleeve 13 which is rigidly secured in any suitable manner to a tapered ferrule 14, which is, in turn, permanently secured on the tapered end of the elongated handle 11, as by means of a transversely extending fastening pin 15, as shown in FIGURES 2 and 3. The socket sleeve 13 is formed with a squared axial bore 16 adapted to receive the squared shank 17 of a selected tool.

The shank 17 of each tool is formed with a plurality of longitudinally spaced transversely extending bores 18. The socket sleeve 13 is formed at its rear portion with a pair of transversely aligned apertures 19, 19 which are registrable with one of the transverse bores 18 of the tool shank 17 when the shank is slidably inserted in the bore 16. Designated at 20 is a yoke member having resilient side arms 21, 21 disposed on opposite sides of the sleeve and extending adjacent the apertures 19, 19. Rigidly secured in the end portions of the side arms 21, 21 are the endwardly extending, transversely aligned locking pins 22, 22 which extend through the apertures 19 and which are of sufficient length to project substantial distances into the squared bore 16, for example, to engage in an aperture 18 of the tool shank 17 when the aperture is in registry with the transversely aligned apertures 19, 19. This is clearly shown in FIGURE 4, wherein it is seen that the pins 22, 22 are engaged in the end portions 24, 24 of the resilient side arms 21, 21, and wherein the pins 22, 22 project substantial distances into the transversely extending bore 18 of the tool shank 17, whereby to lock the tool shank in the square bore 16.

The yoke member 20 is provided with the arcuately curved bight portion 25 which is shaped to be disposed adjacent and to receive the top surface of the sleeve ferrule 14, as viewed in FIGURES 1 and 2, when the yoke member is disposed in its locking position. As shown in FIGURE 2, the side arms 21 of the yoke member are generally arcuately curved to conform with the contour of the ferrule 14 and also are arcuately curved to define curved end portions 26, 26 which are formed integrally with arcuately curved downwardly and inwardly extending cam elements 27, 27 which underlie the sleeve ferrule in the locking position of the device.

As shown in FIGURE 4, the cam elements 27, 27 are disposed closely adjacent to the under surface of the ferrule 14, and the pin elements 22, 22 are urged inwardly by the resiliency of the side arms 21, 21. When the bight portion 25 is elevated, namely, when the yoke 20 is pivoted in a clockwise direction, as viewed in FIGURE 2, around the pins 22, 22, the cam elements 27, 27 are cammingly engageable with the bottom surface of the ferrule member 14, causing the arms 21, 21 to be spread apart, and causing the pin elements 22, 22 to be retracted from the bore 16 to the positions thereof illustrated in FIGURE 5, thus releasing the squared shank 17. Thus, when the yoke member 20 is elevated to the position illustrated in FIGURE 1, the pin elements 22, 22 are retracted from the bore 16 and the shank 17 may be inserted or removed from the bore.

The pin 15 projects sufficiently beyond the ferrule 14 on opposite sides thereof to serve as a stop means to limit the upward rotation of the yoke member 20, the outwardly projecting ends of pin element 15 being engageable by the cam members 27, 27, as shown in FIGURE 5, to limit upward movement of the yoke member 20 to the position thereof wherein the pins 22 are retracted sufficiently to release the tool shank 17, as shown in FIGURE 5.

Therefore, as will be apparent from the above description, in order to insert the shank 17 of a selected tool, it is merely necessary to rotate the yoke member 20 upwardly to the position thereof shown in FIGURE 1, after which the shank 17 may be inserted in the bore 16 to a position wherein one of the apertures 18 of the shank registers with the aligned apertures 19, 19. The yoke member 20 may then be lowered to the position thereof shown in FIGURE 2, the resilient arms 21, 21 exerting spring action to urge the yoke member to its lowered position. This allows the locking pins 22, 22 to move inwardly into locking engagement with the transverse bore 18 of the tool shank 17, whereby to secure the tool shank in the socket bore 16.

While a specific embodiment of an improved tool handle adapter socket has been disclosed in the foregoing description, it will be understood that the various modifications within the spirit of the invention may occur to those skilled in the art. Therefore it is intended that no limitation be placed on the invention except as defined by the scope of the appended claims.

What is claimed is:

1. In a tool handle, a socket comprising a sleeve having a bore adapted to receive the shank of a tool, said sleeve being formed with a pair of transversely aligned pivot apertures communicating with said bore, a generally U-shaped yoke member having an arcuately curved bight portion shaped to be disposed adjacent to and to receive the top portion of the sleeve, said yoke member having resilient side arms disposed on opposite sides of said sleeve and having end portions disposed adjacent said apertures, respective locking pins secured on said end portions and extending rotatably into said apertures, said pins being pivotally received in said apertures at all times and being of sufficient length to extend into said bore, and cam means on said side arms adjacent said end portions engageable with said sleeve responsive to outward rotation of the yoke member and being constructed and arranged to move said end portions outwardly and to move said locking pins axially outwardly sufficiently to clear said bore responsive to rotation of the yoke member outwardly relative to the sleeve.

2. In a tool handle, a socket comprising a sleeve having a bore adapted to receive the shank of a tool, said sleeve being formed with a pair of transversely aligned pivot apertures communicating with said bore, a generally U-shaped yoke member having an arcuately curved bight portion shaped to be disposed adjacent to and to receive the top portion of the sleeve, said yoke member having resilient side arms disposed on opposite sides of said sleeve and having end portions disposed adjacent said apertures, respective locking pins secured on said side arms and extending rotatably into said apertures, said pins being pivotally received in said apertures at all times and being of sufficient length to extend into said bore, and cam means on said side arms adjacent said end portions engageable with said sleeve responsive to outward rotation of the yoke member and being constructed and arranged to retract said locking pins axially sufficiently to clear said bore responsive to rotation of the yoke member in a direction to move said bight portion away from said sleeve.

3. In a tool handle, a socket comprising a sleeve having a bore adapted to receive the shank of a tool, said sleeve being formed with a pair of transversely aligned pivot apertures communicating with said bore, a yoke member having resilient side arms disposed on opposite sides of said sleeve adjacent said apertures and a bight portion arcuately curved to at times be disposed closely adjacent and receive a portion of said sleeve, respective locking pins secured on said side arms and extending rotatably into said apertures, said pins being pivotally received in said apertures at all times and being of sufficient length to extend into said bores, and inwardly projecting cam elements on the bottom edges of the side arms adjacent said locking pins engageable with said sleeve and being constructed and arranged to retract said locking pins axially sufficiently to clear said bore responsive to rotation of the yoke member in a direction to move said bight portion outwardly with respect to said sleeve.

4. In a tool handle, a socket comprising a sleeve having a non-circular bore shaped to receive the shank of a tool, said sleeve being formed with a pair of transversely aligned pivot apertures communicating with said bore, a yoke member having resilient side arms disposed on opposite sides of said sleeve adjacent said apertures and a bight portion arcuately curved to at times be disposed adjacent and receive the top portion of said sleeve, respective locking pins secured on said side arms and extending into said apertures, said pins being pivotally received in said apertures at all times and being of sufficient length to extend into said bore, and inwardly projecting arcuately curved cam elements on the bottom edges of the side arms adjacent said locking pins engageable with said sleeve and being constructed and arranged to retract said locking pins axially sufficiently to clear said bore responsive to rotation of the yoke member in a direction to move said bight portion outwardly with respect to said sleeve.

References Cited in the file of this patent
UNITED STATES PATENTS

| | | |
|---|---|---|
| 988,029 | Prellwitz | Mar. 28, 1911 |
| 1,558,267 | McGuckin | Oct. 20, 1925 |
| 2,022,822 | Purnis | Dec. 3, 1935 |